3,350,860
GAS FILTER
Eugene E. Grassel, Minneapolis, and Donald W. Schoen, St. Paul, Minn., assignors to Donaldson Company, Inc., Minneapolis, Minn., a corporation of Delaware
Filed Dec. 15, 1965, Ser. No. 513,956
3 Claims. (Cl. 55—387)

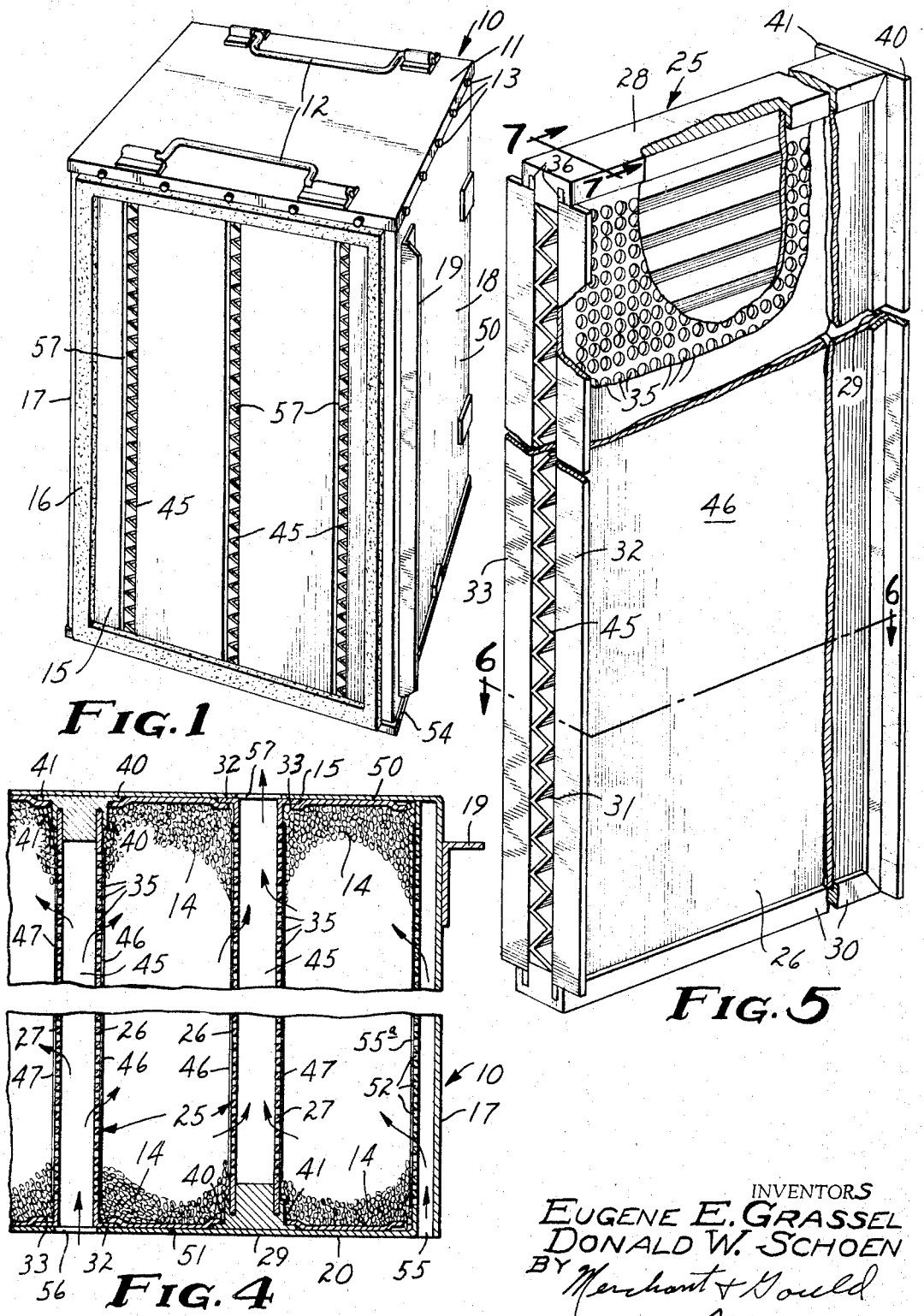

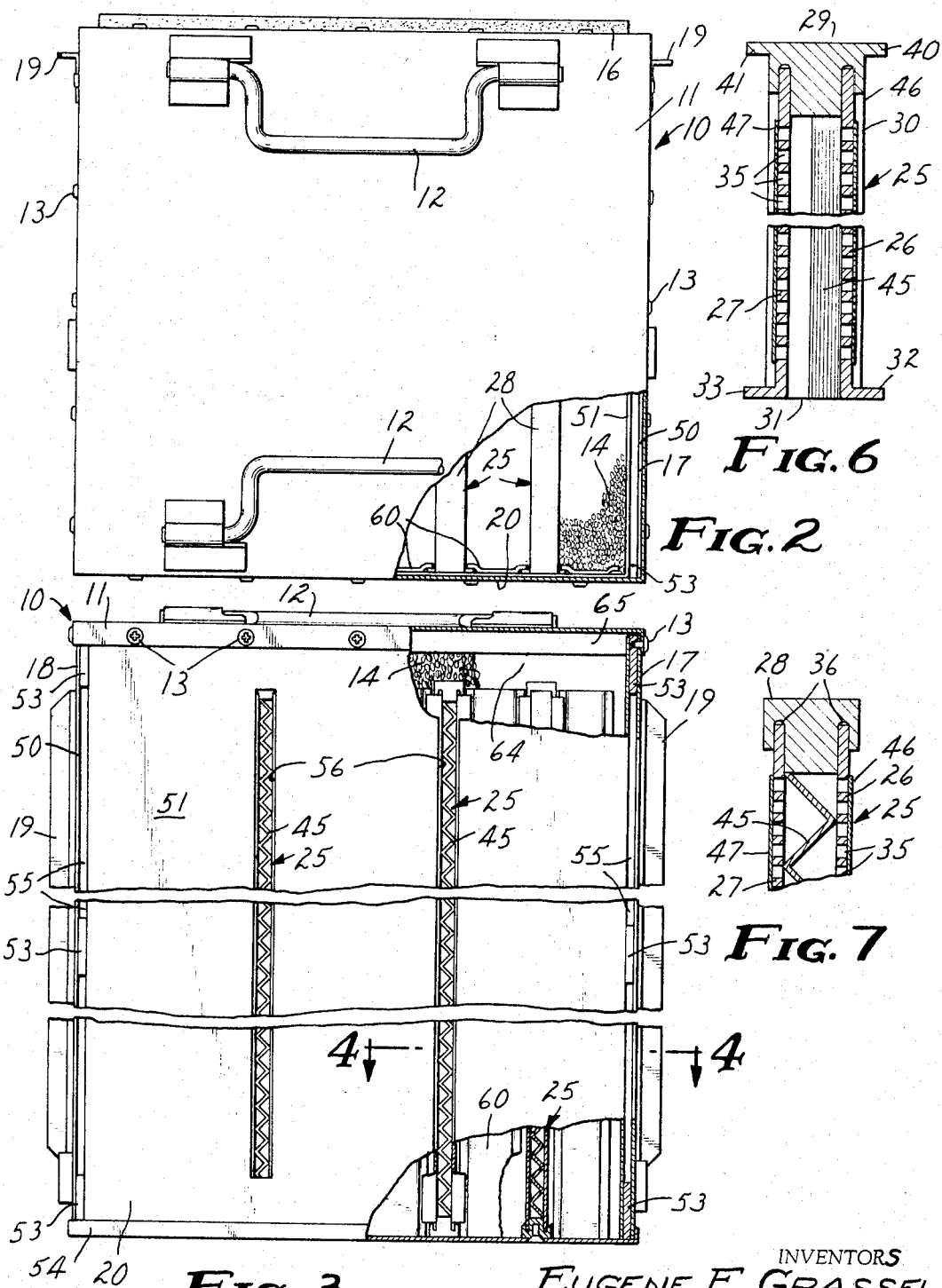

This invention pertains to a gas filter of the type containing granular filter material and more specifically to a gas filter through which the leakage of unfiltered gas is substantially eliminated.

One of the more prominent methods of filtering gas is to route the gas through a chamber containing a granular filter material such as activated charcoal granules. The effectiveness of the filter is dependent upon the velocity and the path length of the gas through the granular material. The passage of the gas through the granular material produces a pressure drop with the amount of drop increasing as the path length increases. It is, therefore, desirable to maintain the path length through the granular material as low as possible. In addition, it is desirable to maintain the gas velocity through the granular material relatively low so that the gas remains within the material a sufficient amount of time to allow the material to absorb the impurities therein. In general a relatively low pressure drop and an adequate period within the material is maintained by utilizing a plurality of chambers of granular material, or paths through the granular material.

In the prior art devices this plurality of paths or chambers was provided by stacks of drawer-like containers filled with granular material. The containers were equally spaced apart with alternate spaces opening on a gas inlet and the remaining spaces opening on a gas outlet. Thus, the gas enters the inlet, filters through the containers of charcoal and passes out through the outlet. However, this system is highly unsatisfactory since the granular material in the containers has a tendency to settle due to attrition, etc. and leave large voids or pockets therein through which the gas can pass freely without filtration. To eliminate this settling and its consequent effects the prior art containers are filled until the sides bulge outwardly creating uneven widths in the containers. Since the gases have a tendency to travel along the path of least resistance very little or no gas passes through the wider portions of the containers, thereby, producing an uneconomical use of the granular material. Also, the containers must be spaced apart an excessive distance due to the bulging sides so that the entire assembly requires too much space for its gas handling capacity. In some prior devices this bulging was controlled by bolts through the midsections of the containers. However, this is unsatisfactory also since there is a tendency for gas to leak through the containers around the bolts. Also, it is very difficult to mount the containers so that gas cannot leak around the edges thereof and travel from the inlet to the outlet without passing through the granular material.

It is an object of the present invention to provide a new and improved gas filter.

It is a further object of the present invention to provide a gas filter constructed so that unfiltered gas cannot leak therethrough.

It is a further object of the present invention to provide a gas filter constructed so that settling of the granular material does not produce voids therein.

It is a further object of the present invention to provide a gas filter which is simpler to construct and use.

It is a further object of the present invention to provide a gas filter that occupies a minimum of space for its gas handling capacity.

It is a further object of the present invention to provide a gas filter which will have a low pressure drop and a maximum gas handling capacity with a minimum size.

These and other objects of this invention will become apparent to those skilled in the art upon consideration of the accompanying specification, claims, and drawings.

Referring to the drawings, wherein like characters indicate like parts throughout the figures:

FIG. 1 is a view in perspective of the present gas filter unit;

FIG. 2 is an enlarged view in top plan of the filter unit, parts thereof broken away and shown in section;

FIG. 3 is an enlarged rear view, or a view of the inlet of the filter unit, parts thereof broken away and shown in section;

FIG. 4 is a sectional view as seen from the line 4—4 in FIG. 3;

FIG. 5 is an enlarged view in perspective of a single duct utilized in the gas filter unit, parts thereof broken away and shown in section;

FIG. 6 is a sectional view as seen from the line 6—6 in FIG. 5; and

FIG. 7 is a sectional view as seen from the line 7—7 in FIG. 5.

In the figures the numeral 10 generally designates a six-sided housing with the upper side forming a cover 11 having a pair of handles 12 thereon for easy movement and maintenance of the filter unit. In addition, the cover 11 is removably mounted to the remainder of the housing 10 by a plurality of screws 13 so that the granular material, which in the present embodiment is activated charcoal granules 14, may be replaced or refilled periodically. Front side 15 (as seen in FIG. 1) of the housing 10 forms an outlet of the filter unit, which will be described in more detail presently, and has a rectangular shaped strip of resilient material 16 completely therearound to provide a gas tight seal between the filter unit 10 and an opening into which the filtered gas is being discharged. Left and right sides 17 and 18 of the filter unit 10 have flanges 19 extending therefrom, which are adapted to have a pressure applied thereto for maintaining the resilient material 16 around the inlet 15 tightly against a surface. The rear 20 of the housing 10 has a gas inlet therein which will be described in more detail presently.

A plurality of ducts generally designated 25 are mounted within the housing 10. An enlarged view of a single duct 25 is illustrated in FIG. 5. The duct 25 is a hollow, six-sided box-like structure which extends from the bottom of the housing 10 to within a short distance of the top 11. The width of the duct 25 is approximately equal to the distance from the side 15 to the side 20 of the housing 10. The duct 25 has a relatively shallow depth so that two parallel sides 26 and 27 are spaced a relatively short distance apart by the four remaining sides 28, 29, 30 and 31, which are located at the top, rear, bottom and front respectively as viewed in FIG. 5.

Each of the ducts 25 is constructed in the same manner. A large thin panel of rigid material, which is preferably a light metal or the like, is bent along one edge to form a flange 32 extending outwardly and parallel with the front side 31 of the duct 25. This material extends rearwardly to form the side 26. A similar panel of material extends rearwardly to form the side 27 of the duct 25 and the edge is bent outwardly at 90° to form a second flange 33 extending outwardly parallel to the front side 31 but opposite the flange 32. A plurality of regularly spaced perforations 35 are formed in the material of the sides 26 and 27 of the duct 25. The sides 26 and 27 have perforations 35 therethrough over substantially their entire area, except that no perforations 35 are located in the sides 26 or 27 within a predetermined distance from the edge, which, for example, may be approximately equal to one half of the minimum desirable path length for the gas through the charcoal granules. It should be understood that this feature is not a necessity to the invention but is an added safety feature to prevent the leakage of unfiltered gas through the filtering unit.

The top, rear and bottom 28, 29 and 30 respectively of the duct 25 are constructed from solid pieces of rigid material in which a pair of equally spaced parallel grooves 36 are provided. The upper, rear and lower edges of the sides 26 and 27 are fitted into the grooves 36 to maintain them rigidly spaced and to make the junction with the top, rear and bottom 28, 29 and 30 of the duct 25 gas tight. In addition, the junction between the sides 26 and 27 and the top 28, rear 29 and bottom 30 may be sealed by welding or the like to make the construction more rigid and to prevent the leakage of gas therethrough. The junctions of the solid pieces forming the top, rear and bottom 28, 29 and 30 of the duct 25 are mitered and welded or otherwise fixedly secured to make them leakproof. The solid piece forming the rear 29 has a pair of flanges 40 and 41 extending outwardly from either side thereof approximately flush with the rearmost edge and extending the length of the rear 29.

A corrugated piece of rigid material 45 is positioned within the duct 25 so that it extends from the top 28 and the bottom 30 and the folds form parallel channels extending from the open front side 31 to the rear side 29. The corrugated material 45 is utilized to strengthen the sides 26 and 27 and prevent bulging or the like thereof. Since the sides 26 and 27 of the ducts 25 remain rigid the ducts 25 can be positioned closer together with no danger of a gas path reduction due to the sides 26 and 27 bulging and reducing the distance therebetween. Also the air ducts 25 can be constructed narrower because no allowance for bowing or bulging need be made. This results in a reduction in overall size of the filter unit. Each of the sides 26 and 27 has a covering 46 and 47 respectively of gas permeable material, such as a fabric or the like, fixedly attached thereto in some manner, such as gluing, which serves to prevent the granular charcoal 14 from entering the perforations 35 therein.

The housing 10 is constructed of a pair of U-shaped members 50 and 51 which are nested together so that the bights form the front side 15 and the rear side 20 respectively. The U-shaped members 50 and 51 are constructed so that the sides thereof lie parallel to one another and spaced apart a short distance when they are nested in their assembled position. The sides of the U-shaped member 51 are positioned inwardly from the sides of the U-shaped member 50 and have a plurality of perforations 52 therein for the passage of gas therethrough. Three spacer blocks 53 are positioned between the sides of the members 50 and 51 at either side thereof and extend from the front side 15 to the rear side 20.

A lower side or bottom 54 of the housing 10 having an upwardly extending lip around the edge thereof is fixedly attached to the members 50 and 51 by some means such as welding or the like to provide gas-tight joints therebetween. A sheet of gas permeable material 55a is fixedly attached to the inner surface of the sides of the member 51 to prevent the granular charcoal 14 from entering the holes 52 therein. When the cover 11 is attached as previously described there is an opening 55 at either side of the rear side 20 through which gas may enter the housing 10. In addition, two elongated slots 56 are cut in the rear side 20 in an approximately equal spaced apart relationship parallel with the sides 17 and 18. Also, three elongated slots 57 are cut in the front side 15 in an approximately equally spaced apart relationship parallel with the sides 17 and 18. The slots 56 and 57 are cut so that they lie in approximately alternate parallel planes through the housing 10.

The inner surfaces of the sides 15 and 20 of the housing 10 have a plurality of strips 60 of rigid material, such as metal or the like, extending from the bottom 54 to within a short distance of the cover 11. The strips 60 are evenly spaced apart and the edges thereof are bent outwardly from the sides 15 and 20 slightly to form channels with adjacent strips 60 into which the flanges 32–33 and 40–41 on the ducts 25 may be slideably engaged. The strips 60 are fixedly attached to the inner surface of the members 50 and 51 forming the sides 15 and 20 by some means such as welding or the like. Five ducts 25 are slideably engaged in the channels between the strips 60 within the housing 10 with the open ends 31 alternately adjacent the front side 15 and the rear side 20. The strips 60 and the ducts 25 are arranged so that the open side 31 of the ducts 25 coincides with either the slots 56 or the slots 57. The slots 56 and the openings 55 located in the rear side 20 of the housing 10 form an inlet for the filter unit while the slots 57 located in the front side 15 form an outlet for the filter unit. Thus, air under pressure is free to enter the openings 55 and the slots 56 passing through the perforations 52 and 35 in the side walls thereof respectively into a space between the ducts 25 after which it passes through the perforation 35 in the side walls of the adjacent ducts 25 and out the openings 57 in the opposite side 15 of the housing 10.

To fill the filter element with the charcoal granules 14 the cover 11 is removed and charcoal granules 14 are poured into the housing 10 until they are approximately level with the top thereof. This provides a reservoir 64 of granules 14 at the top of the unit so that subsequent settling of the granules 14 between ducts 25 will not leave voids or reduce the amount of granules 14 therebetween. The cover 11 has a relatively thick layer of resilient padding 65 fixedly attached to the undersurface thereof. When the housing 10 is filled with charcoal granules 14 and the cover 11 placed firmly in position the resilient padding 65 exerts a pressure on the charcoal granules 14 which tends to prevent the charcoal granules 14 from developing voids therein. The resilient padding 65 acts like a spring which maintains a pressure on the charcoal granules 14 as they settle and keeps the granules 14 properly distributed. In addition, the constant pressure on the charcoal granules 14 tends to prevent relative movement therebetween and, therefore, it prevents attrition or the wearing action with a consequent settling.

Thus, a gas filter unit has been described in which the leakage of unfiltered gas is eliminated since any leakage paths of the gas must be through the granular filter material. In addition, resilient means within the filter unit maintain a pressure on the granular filter material which substantially prevents voids therein. Also, the housing 10 has a substantial area above the ducts 25 which acts as a reservoir for the granular filter material to prevent voids during settling and the like. In addition to the above advantages the present filter unit is simpler to construct and more compact than the prior art devices.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:
1. A gas filter comprising:
 (a) a generally box-like housing having an inlet in at least one side thereof and an outlet in at least a second side thereof and adapted to have a gas flow therethrough;
 (b) a plurality of individually removable elements each having side walls with a plurality of perforations through at least a portion thereof, a closed end and an oppositely disposed open end for the movement of relatively large quantities of gas therethrough, said ends and side walls being fixedly connected together in a unitary element to form a gas duct;

(c) means mounting said elements within said housing in parallel spaced apart relationship with a portion thereof having said open ends in communication with said housing inlet and the remainder having said open ends in communication with said housing outlet;

(d) granular filter material filling said housing around said elements so that all gas flowing from said housing inlet to said housing outlet passes through at least a minimum desirable path length of filter material;

(e) said housing further having an opening with a removable cover thereon in a side other than the sides containing said inlet and said outlet and perpendicular to the plane of the perforated sides of said elements, said opening being adapted for the removal and replacement of said elements and said granular filter material; and (f) means in juxtaposition to the inner surface of the removable cover for applying a light pressure to said granular filter material to prevent said material from producing voids therein when settling.

2. A gas filter comprising:

(a) a generally box-like housing having an inlet in at least one side thereof and an outlet in at least a second side thereof and adapted to have a gas flow therethrough;

(b) a plurality of individually removable elements each including a hollow, six sided box-like structure having two oppositely disposed sides with a plurality of relatively small perforations therein spaced from the edges thereof and three of the remaining adjoining sides being gas tight with the fourth remaining adjoining side being open to provide for the movement of gas therethrough;

(c) means mounting said elements within said housing in parallel spaced apart relationship with a portion thereof having said open sides in communication with said housing inlet and the remainder having said open sides in communication with said housing outlet;

(d) granular filter material filling said housing around said elements so that all gas flowing from said housing inlet to said housing outlet passes through at least a minimum desirable path length of filter material; and (e) said housing further having an opening with a removable cover thereon in a side other than the sides containing said inlet and said outlet and perpendicular to the plane of the perforated sides of said elements, said opening being adapted for the removal and replacement of said elements and said granular filter material.

3. A gas filter substantially as set forth in claim 2 wherein the elements have a plurality of braces therein to maintain the perforated sides of said elements substantially rigid and fixed relative to each other while allowing the flow of gas therethrough.

References Cited

UNITED STATES PATENTS

| | | | |
|---|---|---|---|
| 57,639 | 8/1866 | Rowley et al. | 55—476 |
| 632,397 | 9/1899 | Chollar | 55—476 X |
| 1,982,099 | 11/1934 | Hechenbleikner | 55—479 X |
| 2,055,774 | 9/1936 | Ray | 55—479 X |
| 2,108,087 | 2/1938 | Thayer | 55—476 X |
| 2,884,091 | 4/1959 | Baldwin | 55—502 X |
| 3,186,149 | 6/1965 | Ayers | 55—387 |
| 3,246,456 | 4/1966 | Sharp | 55—502 X |

FOREIGN PATENTS 767,555 2/1957 Great Britain.

SAMIH N. ZAHARNA, *Primary Examiner.*

REUBEN FRIEDMAN, *Examiner.*

J. ADEE, *Assistant Examiner.*